Figure 1:
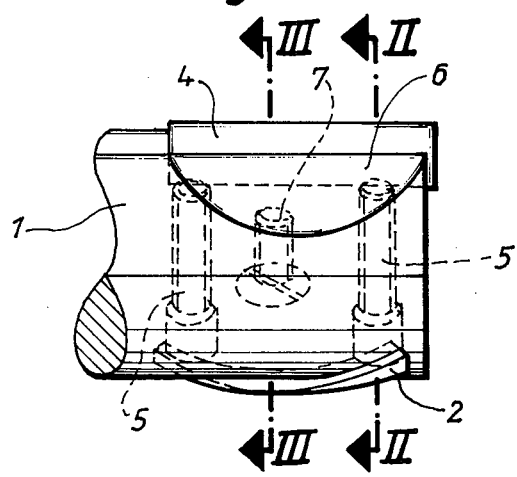

United States Patent [19]

Kress

[11] 4,030,855
[45] June 21, 1977

[54] REAMING TOOL
[75] Inventor: Dieter Kress, Aalen, Germany
[73] Assignee: Mapal Dr. Kress KG, Aalen, Germany
[22] Filed: Dec. 5, 1973
[21] Appl. No.: 421,955
[30] Foreign Application Priority Data
　　Dec. 11, 1972　Germany .......................... 2260470
[52] U.S. Cl. .............................................. 408/226
[51] Int. Cl.² ......................................... B23B 51/00
[58] Field of Search ............... 408/226, 83, 82, 81, 408/80, 181, 147, 153, 185, 705; 175/325, 408; 308/4 A

[56] References Cited
UNITED STATES PATENTS

| | | | |
|---|---|---|---|
| 2,303,487 | 12/1942 | Miller | 408/226 X |
| 2,977,829 | 4/1961 | Thoma | 408/181 |
| 3,447,839 | 6/1969 | Salvatori | 308/4 A |
| 3,490,315 | 1/1970 | Melchiorre | 408/153 |

FOREIGN PATENTS OR APPLICATIONS 1,202,110　1/1960　France .............................. 175/325

Primary Examiner—J. M. Meister
Attorney, Agent, or Firm—Hans Berman

[57] ABSTRACT

A reaming tool having a single blade in the head portion of its shank is provided with two axially elongated guide ribs radially and axially approximately coextensive with the cutting edge of the blade. One guide rib is diametrically opposite the cutting edge, and the other one is much nearer to the cutting edge than to the other rib so that the angular center-to-center spacing of the two ribs is bisected by the resultant force defined by the circumferential cutting force exerted by the cutting edge on a body of mild steel during reaming at a cutting speed of 5 to 100 meters per minute and at an axial feed rate of 0.1 to 0.5 mm per revolution, and the radially inward force of reaction acting on the cutting blade during the reaming.

6 Claims, 3 Drawing Figures

REAMING TOOL

This invention relates to reaming tools, and particularly to an improved tool of the adjustable-blade reamer type.

It was proposed in my copending application for a "fine-boring tool"; Ser. No. 415,992, filed Nov. 15, 1973, now U.S. Pat. No. 3,880,545; to provide the axially terminal, blade-carrying portion of a reamer shank with two guide ribs approximately coextensive with the cutting edge of the blade in an axial and radial direction. The ribs slide along the reamed cylindrical surface of a workpiece to center the blade in the bore and to transmit the forces of reaction from the tool to the workpiece.

The known reaming tools carry one guide rib diametrically opposite to the cutting edge, and the other rib is offset from the cutting edge in a direction opposite to the cutting direction in which the edge is circumferentially directed in order to distribute the reaction forces approximately equally between the two ribs.

In addition to their stress-transmitting function, the ribs also smoothen the relatively rough surface machined by the blade. Because the smoothing effect improves greatly with increasing contact pressure between the rib and the wall of the reamed bore, every effort was made to make the guide ribs as narrow as possible.

It has now been found that the force or stress exerted by and on the cutting blade during reaming of a bore varies greatly in its magnitude and direction at high cutting speeds. This force may be defined as the resultant of the cutting force exerted by the blade in a circumferential or tangential direction and the reaction of the workpiece acting on the cutting edge of the blade in a radially inward direction. It has been found that this resultant is affected but little by the cutting speed of a blade of adequate sharpness, and is greatly affected by the rate of axial tool advance or feed rate, and by the rake angle selected.

It has been found that the resultant produced by a cutting speed of 5 to 100 meters per minute and an axial feeding rate of 0.1 to 0.5 millimeter per revolution of relative rotation of the tool and workpiece while reaming a bore in mild steel and most other metals can be distributed uniformly over both guide ribs, if the resultant bisects the angular, circumferential, center-to-center spacing of the two ribs at one cutting speed and one feeding rate within the ranges indicated above, preferably at the median values of approximately 52 meters per minute and 0.3 millimeter per revolution.

For precisely guiding the cutting edge, the guide ribs should have a combined effective width of at least 72°, that is, one fifth of the circumference of the reamed bore. The effective width is the greatest angular distance between the two longitudinal faces of the rib transverse to the shank surface and may be substantially greater than the actual angular width of any longitudinal portion of the rib, as will presently become apparent. It is possible thereby to achieve the desirable high contact pressure between rib and workpiece without compromising the precision of the guiding effect.

Figure 2:
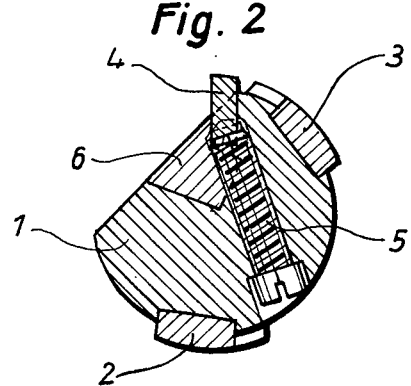
Figure 3:
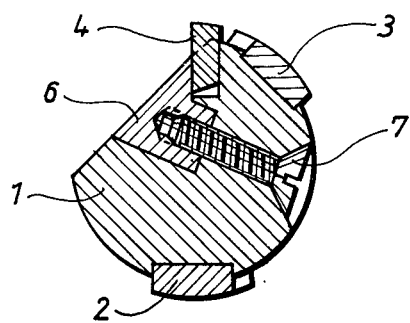

Other features and many of the attendant advantages of this invention will readily be appreciated as the same becomes better understood by reference to the following detailed description of a preferred embodiment when considered in connection with the appended drawing in which:

FIG. 1 shows an adjustable-blade reaming tool of the invention in fragmentary side elevation; and FIGS. 2 and 3 respectively illustrate the tool of FIG. 1 in section on the lines II — II and III — III.

Only the axially terminal head portion 1 of the tool shank is seen in the drawing. It has the approximate overall shape of a 240° segment of a cylinder. Two elongated guide ribs 2, 3 are fixedly fastened to the head portion 1 and project radially beyond its cylindrically arcuate surface. The direction of elongation of the ribs 2, 3 has a predominant axial component, but they extend in respective helical segments about the shank axis, the direction of helical twist being counterclockwise as viewed from the free end of the tool shank.

The cutting blade 4 of the reamer is set into an axial slot of the head portion 1, and its cutting edge radially projects from the shank. The projecting portions of the two ribs 2, 3 and of the blade 4 are radially coextensive and axially coextensive over most of their axial lengths. Two axially spaced adjusting screws 5 are threadedly received in respective bores of the head portion 1 to permit radial adjustment of the cutting edge on the blade 4 when the screws are moved inward or outward of the blade receiving groove.

As is known in itself, the blade 4 is fastened to the tool shank in the desired adjusted position by a clamping jaw 6 tightened against the blade 4 by a screw 7 freely rotatable in a bore of the head portion 1. The planar outer face of the jaw 6 facilitates the flow of chips from the cutting edge of the blade 4.

The rib 2 and the cutting edge on the blade 4 project from the head portion 1 of the shank in diametrically opposite directions, as is best seen in FIGS. 2 and 3. The other guide rib 3 is offset from the cutting edge in a counterclockwise direction opposite to the cutting direction of the blade 4. The angular center-to-center spacing of the two ribs 2, 3 relative to the shank axis is much greater than the angular spacing of the circumferential center of the rib 3 from the cutting edge of the blade 4. The last-mentioned spacing should be less than 45°, and is less than 40° in the illustrated tool.

For the purpose of determining the spacings referred to above, the effective width of each rib 2, 3 is determined in a radial plane of projection, as partly evident from FIG. 2 or 3. The effective width is thus measured between two parts of the rib which are not axially coextensive, but separated by the full axial length of the rib. The circumferential center of the rib is angularly equidistant from the two parts.

For the purpose of uniform distribution of smoothing stresses, the effective width is most important. It is significantly greater in the illustrated ribs than the actual width which is measured in any one radial plane, as in the sectioned rib parts shown in FIGS. 2 and 3, and determinative of contact pressure. In straight, axial ribs, the effective angular width of each rib evidently is equal to the actual width.

It should be understood, of course, that the foregoing disclosure relates to a preferred embodiment and that it is intended to cover all changes and modifications in the example of the invention chosen for the purpose of the disclosure which do not constitute departures from the spirit and scope of the invention set forth in the appended claims.

What is claimed is:
1. A reaming tool comprising:
   a. a shank having an axis and an axially terminal head portion;

b. a single blade fastened to said head portion,
  1. said blade having a cutting edge elongated in the direction of said axis, radially projecting from said shank, and facing in a circumferential cutting direction; and
c. two guide ribs fastened to said head portion,
  1. said guide ribs being each elongated in a helix about said axis and radially projecting from said head portion in circumferentially spaced relationship.
  2. the projecting portions of said guide ribs being axially coextensive with said cutting edge over substantially the entire length of said cutting edge and radially coextensive with said cutting edge,
  3. one of said guide ribs and said cutting edge projecting from said head portion in diametrically opposite directions,
  4. the other guide rib being offset from said cutting edge in a direction opposite to said cutting direction,
  5. the angular center-to-center spacing of said guide ribs relative to said axis being much greater than the angular spacing of the circumferential center of said other guide rib from said cutting edge.

2. A tool as set forth in claim 1, wherein the combined, effective, angular width of said guide ribs is at least 72°.

3. A tool as set forth in claim 1, wherein said angular spacing of the circumferential center of said other guide rib from said cutting edge is smaller than 45°.

4. A tool as set forth in claim 3, wherein said last-mentioned spacing is not greater than 40°.

5. A tool as set forth in claim 1, wherein said guide ribs are of uniform width over the entire length thereof.

6. A tool as set forth in claim 1, wherein said head portion has a free axial end, and the direction of helical twist of each guide rib is counterclockwise, as viewed axially from said free end.

* * * * *